United States Patent
Dunn (10) Patent No.: US 10,336,145 B1
(45) Date of Patent: Jul. 2, 2019

(54) MULTIPLE BALL SIZE/CLEVIS HITCH

(71) Applicant: The Delta Company, LLC, Itta Bena, MS (US)

(72) Inventor: Clinton J. Dunn, Itta Bena, MS (US)

(73) Assignee: The Delta Company, LLC, Itta Bena, MS (US)

( * ) Notice: Subject to any disclaimer, the term of this patent is extended or adjusted under 35 U.S.C. 154(b) by 153 days.

(21) Appl. No.: 15/697,045

(22) Filed: Sep. 6, 2017

Related U.S. Application Data (60) Provisional application No. 62/384,948, filed on Sep. 8, 2016.

(51) Int. Cl.
| | |
|---|---|
| *B60D 1/06* | (2006.01) |
| *B60D 1/02* | (2006.01) |
| *B60D 1/07* | (2006.01) |
| *B60D 1/145* | (2006.01) |
| *B60D 1/36* | (2006.01) |
| *B60D 1/52* | (2006.01) |

(52) U.S. Cl.
CPC ............... *B60D 1/025* (2013.01); *B60D 1/06* (2013.01); *B60D 1/07* (2013.01); *B60D 1/145* (2013.01); *B60D 1/363* (2013.01); *B60D 1/52* (2013.01)

(58) Field of Classification Search
CPC .......... B60D 1/025; B60D 1/06; B60D 1/067; B60D 1/07; B60D 1/145; B60D 1/363; B60D 1/52
See application file for complete search history.

(56) References Cited

U.S. PATENT DOCUMENTS

| | | | | | |
|---|---|---|---|---|---|
| 5,890,728 | A | * | 4/1999 | Zilm ...................... | B62D 53/08 280/406.2 |
| 5,934,698 | A | * | 8/1999 | Despain ................... | B60D 1/46 280/490.1 |
| 6,155,587 | A | * | 12/2000 | Milazzo ................... | B60D 1/06 280/457 |
| 6,554,311 | B1 | * | 4/2003 | Blankenship ............ | B60D 1/06 280/164.1 |
| 6,802,523 | B1 | * | 10/2004 | Profit ..................... | B60D 1/025 280/432 |
| 6,932,376 | B1 | * | 8/2005 | Profit ..................... | B60D 1/065 280/432 |
| 7,029,022 | B2 | * | 4/2006 | Moss ....................... | B60D 1/06 280/416.1 |
| 7,204,505 | B2 | * | 4/2007 | Moss ....................... | B60D 1/06 280/416.1 |
| 7,823,904 | B2 | * | 11/2010 | Coy ......................... | B60D 1/06 280/504 |

(Continued)

*Primary Examiner* — Kevin Hurley
*Assistant Examiner* — Gabriela C Craciun
(74) *Attorney, Agent, or Firm* — Sandberg Phoenix & von Gontard, P.C.

(57) ABSTRACT

A multiple hitch member assembly is described for connecting a trailer to a tow vehicle where a hitch member is rotatably with respect to a main hitch member that is connected to a hitch receiver on the tow vehicle, where the hitch member carries a plurality of hitch elements (e.g., ball hitches of varying sizes) and where with the main hitch member secured to the hitch receiver the hitch member is rotatable to position a desired hitch element to be connected to a trailer or the like such that the hitch member cannot be removed from the main hitch member.

11 Claims, 5 Drawing Sheets

(56) References Cited

U.S. PATENT DOCUMENTS

| | | | |
|---|---|---|---|
| 8,366,133 B2* | 2/2013 | Brinkley | B60D 1/07 |
| | | | 280/415.1 |
| 9,027,950 B2* | 5/2015 | Lahn | B60D 1/06 |
| | | | 280/506 |
| 9,555,746 B2* | 1/2017 | Weihl | B60R 11/06 |
| 9,707,811 B2* | 7/2017 | Columbia | B60D 1/07 |
| 9,896,040 B2* | 2/2018 | Weihl | B60R 11/06 |
| 10,183,537 B2* | 1/2019 | Jennex | B60D 1/06 |
| 2010/0201102 A1* | 8/2010 | Weaver | B60D 1/025 |
| | | | 280/506 |

\* cited by examiner

MULTIPLE BALL SIZE/CLEVIS HITCH

CROSS-REFERENCE TO RELATED APPLICATIONS

This application claims priority to U.S. Provisional Application No. 62/384,948, filed Sep. 8, 2016, which application is incorporated by reference in its entirety.

STATEMENT REGARDING FEDERALLY SPONSORED RESEARCH OR DEVELOPMENT

Not Applicable.

BACKGROUND OF THE DISCLOSURE

This disclosure relates to a multiple size ball/clevis trailer hitch for the attachment to a hitch receiver of a vehicle, where the trailer hitch may be readily rotated relative to the hitch receiver so that a ball hitch of the required size, or a clevis hitch, is in position to readily receive a socket hitch attached to a trailer or to receive a tang-type hitch attached to the trailer, without having to remove the multiple size ball/clevis trailer hitch from the receiver to rotate it to the proper position.

As is typical in many situations, such as on a farm or at a construction site, a tow vehicle, such as a pickup truck, is used to tow a variety of different trailers. These trailers may have conventional socket-type hitches intended to be installed on a ball-type hitch connected to the tow vehicle. Socket-type hitches are commercially available in a variety of sizes such that it is necessary to have a trailer hitch attached to the vehicle with the correct ball size in order to properly hitch the trailer to the tow vehicle. Three common sizes of balls are, for example, 1⅞", 2", or 2 5/16", but other sizes may be used.

So-called triple ball hitches are known that comprise a main hitch member, typically a square tube, which is adapted to be received in a hitch receiver that is attached to the tow vehicle. The hitch receiver typically has a square opening therein sized to readily receive the main hitch member. A pin secures the main hitch member to the hitch receiver and transmits pulling and braking loads between the tow vehicle and the trailer. Because the opening of the hitch receiver is sized to loosely receive the main hitch member, and because of the generally square shapes of the main hitch member and the receiver, the main hitch member is prevented from rotating relative to the receiver. In such triple ball conventional hitches, another type of a hitch (such as a clevis or a hook hitch) may be provided on a fourth side of the main hitch member, such that another type of a trailer not having a ball hitch may be towed by the tow vehicle.

However, one disadvantage of conventional triple ball hitches has been that it is necessary to completely remove the main hitch member from the receiver to rotate the hitch from one rotary position to another, so as to position the proper sized ball in the proper (or upper position) to receive the socket of the trailer. Not only were such triple ball hitches relatively heavy weighing about 25 pounds (11 kg), thus making them cumbersome to remove from and to re-install in the hitch receiver, but if such a 3 ball hitch was locked to the hitch receiver by installing a lock on the pin securing the 3 ball hitch to the receiver, it was necessary for the user to have a key for the lock in order to change ball sizes. As will be readily appreciated, on a farm or construction site, the driver of the tow vehicle may not have the key for the trailer lock as multiple drivers will often drive the tow vehicle. As such, it often took considerable time for the driver of the tow vehicle to locate the key and then to unlock, remove the main hitch member from the receiver, rotate the 3 ball hitch to the desired position, re-install the main hitch member in the receiver and to re-install the lock. Of course, if a lock was not used, it was possible for an unauthorized person to remove a conventional 3 ball hitch from the tow vehicle.

Thus, there has been a long-standing need for a multiple ball hitch that is received in the hitch receiver and is locked to the receiver of a tow vehicle in the conventional manner, which may be readily rotated relative to the receiver to position the desired hitch ball (or another type of hitch) in position to be hitched to a variety of trailers without the necessity of unlocking or removing the main hitch member from the receiver.

SUMMARY OF THE DISCLOSURE

A first preferred embodiment of a multiple hitch member hitch is disclosed for connecting a trailer to a tow vehicle where the tow vehicle has a hitch receiver secured to the tow vehicle. The hitch has a main hitch shaft and an outer hitch tube that rotatably receives the shaft where the main hitch shaft has an end retaining plate secured to its distal end, where the retaining plate is somewhat larger than the outer hitch tube. The main hitch shaft has a length sufficient to extend through the outer hitch tube and to be received in the hitch receiver. The outer hitch tube has a plurality of hitch members, such as hitch balls or the like, secured thereto at different angular positions thereon. The hitch shaft further has a first retainer pin receiving hole therethrough proximate its proximal end for receiving a first pin for coupling the hitch shaft to the hitch receiver and a second retainer pin receiving hole more proximate its outer end for receiving a second pin for coupling the main hitch shaft to the outer hitch tube. Thus, with the first pin in place securing the hitch member shaft to the hitch receiver and with the second pin removed, the outer hitch tube may be rotated on the hitch shaft so as to enable a desired hitch member to be rotatably positioned in a desired position, and the end retaining plate prevents the removal of the hitch shaft and the hitch from the hitch receiver. Of course, the second pin may be re-installed thus fixing the hitch shaft in place with a desired hitch ball in place to hitch a trailer or the like to the tow vehicle.

Another embodiment of a multiple hitch member assembly is disclosed for connecting a trailer to a tow vehicle where the tow vehicle has a hitch receiver secured to the tow vehicle. This other hitch assembly comprises a main hitch member adapted to be secured to the hitch receiver. The assembly has a hitch member rotatable with respect to the main hitch member and has a plurality of hitch elements (e.g., hitch balls or a clevis hitch or the like) secured thereto at different angular positions. The main hitch member has a retainer proximate its distal end with the retainer configured to engage a retainer surface on the hitch member so as to prevent outward movement of the hitch member relative to the main hitch member. The main hitch member further has a first retainer pin receiving hole therethrough proximate its proximal end configured to receive a first pin for coupling the main hitch member to the hitch receiver, and a second retainer pin receiving hole more proximate the distal end of the main hitch member configured to receive a second pin for coupling the hitch member to the main hitch member so as to prevent rotation and endwise movement of the main hitch member and the hitch member relative to one another. The main hitch member is further configured so that with the first pin in place and so that with the second pin removed, the hitch member is rotatable relative to the main hitch member so as to rotatably position a selected one of the hitch elements in a desired position so that a trailer may be hitched to the tow vehicle using the one selected hitch element. The hitch member has a plurality of holes therethrough for receiving the second pin such that with the second pin removed the hitch member may be rotated with respect to the main hitch member so that a desired hitch element may be rotatably positioned in the desired position and so that the retainer prevents endwise removal of the hitch member from the main hitch member and so that with the second pin re-installed in a respective hole in the hitch member and re-installed in a respective hole of hitch member the hitch member is coupled to the main hitch member and is fixed against rotation with respect to the main hitch member.

BRIEF DESCRIPTION OF THE DRAWINGS

FIG. 2 is an exploded isometric perspective view of the main components of the hitch of the present disclosure illustrating that a main hitch member is a round shaft, and illustrating a hitch tube sized to rotatably receive the main hitch member, where an end retaining plate is of somewhat larger size or cross section than the opening of the hitch tube, where the end retaining plate is secured (e.g., welded) to the distal end of the main hitch member, where the main hitch member is of sufficient length to extend through the hitch tube and to be received within a hitch receiver secured to a tow vehicle, and where the main hitch member has a pair of holes therethrough for receiving a first pin for securing the main hitch member within the receiver and a second pin for securing the main hitch member within the hitch tube;

Corresponding reference characters indicate corresponding parts throughout the several views of the drawings.

DETAILED DESCRIPTION OF PREFERRED EMBODIMENTS

Figure 1:
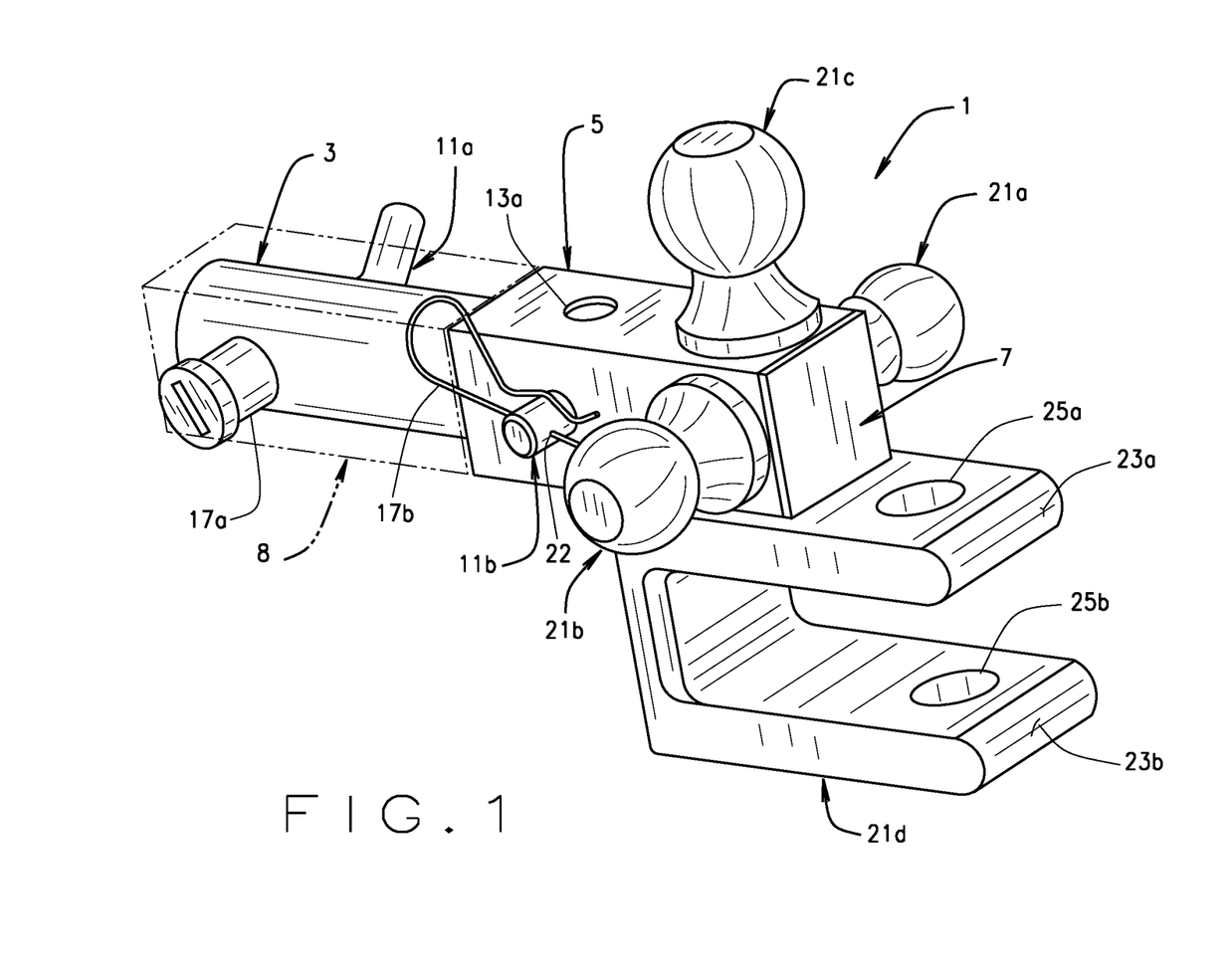
FIG. 1 is an isometric view of the hitch of the present disclosure installed in a hitch receiver (shown in phantom) connected to a tow vehicle, where the hitch caries three different sized hitch elements (e.g., balls) and another type of a hitch (e.g., a clevis) that may be readily positioned relative to the receiver so that a trailer with any of three socket sizes or a clevis (or other type of hitch, such as a hook hitch) may be utilized to hitch the trailer to the tow vehicle.
Figure 2:
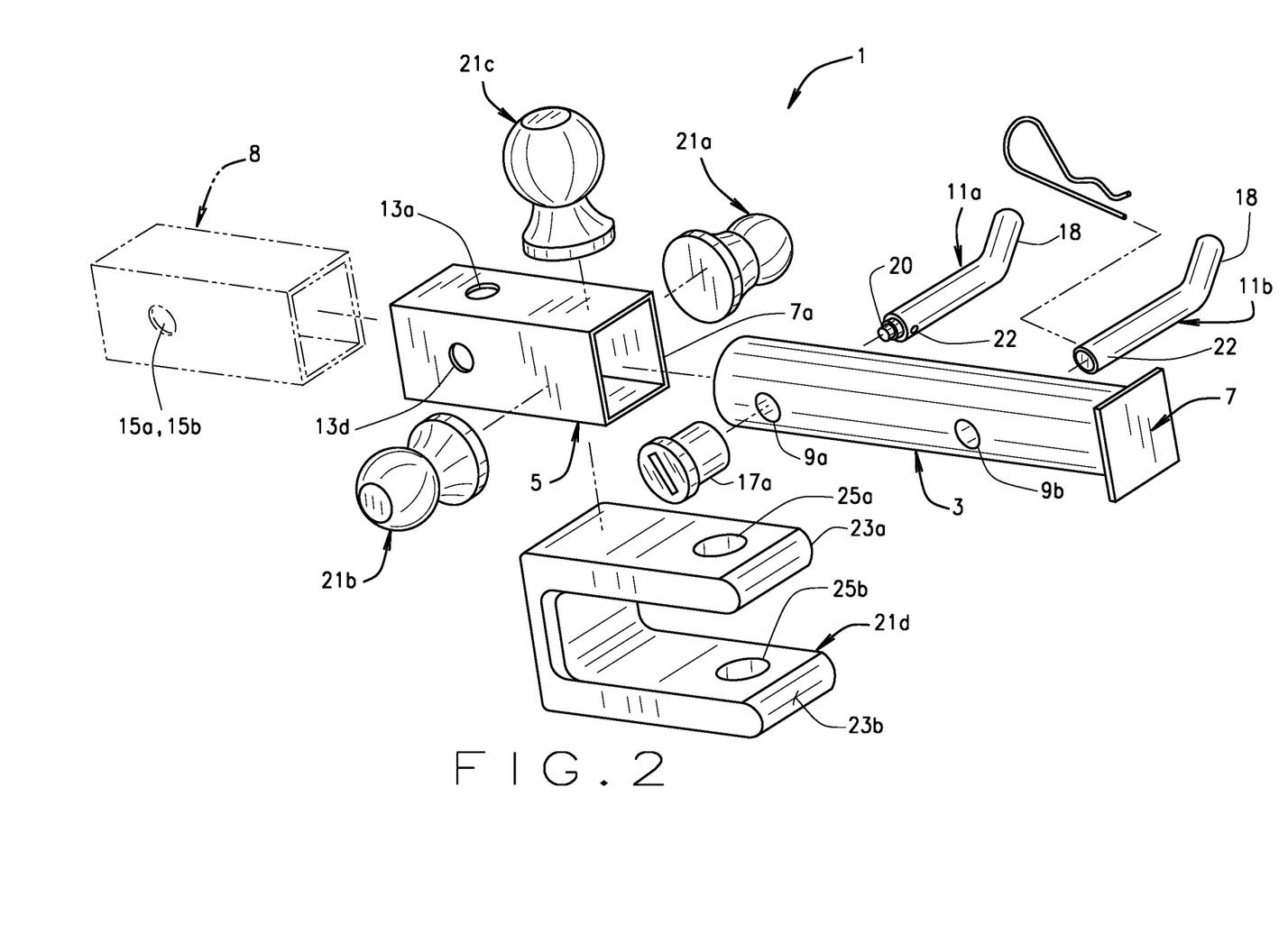
Figure 3:
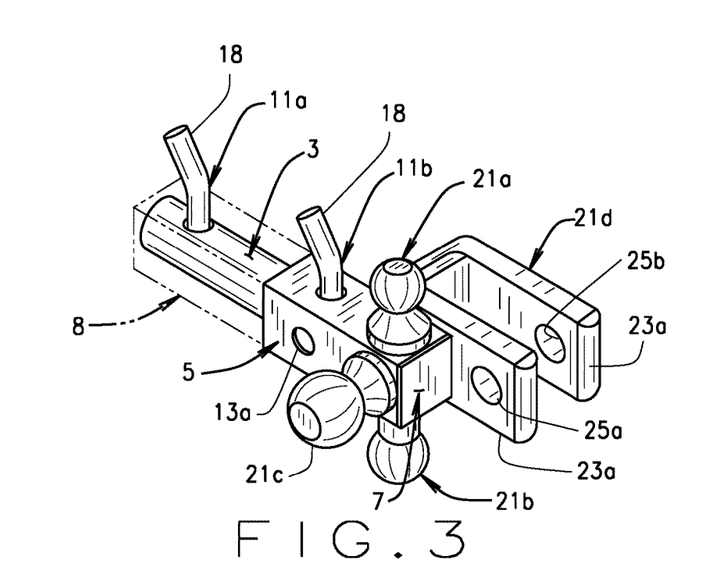
FIG. 3 is an isometric view of the hitch of the present disclosure on a somewhat smaller scale than FIGS. 1 and 2.
Figure 4:
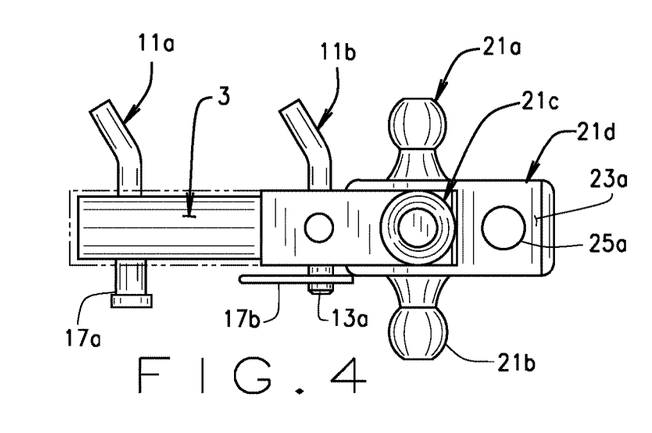
FIG. 4 is a top plan view of the hitch shown in FIG. 3.
Figure 5:
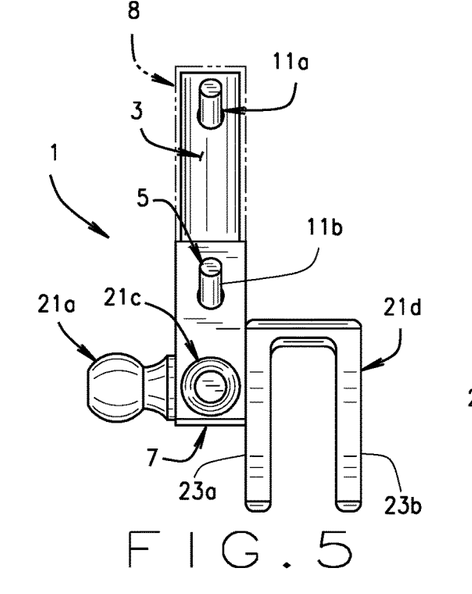
FIG. 5 is a first side elevational view of the hitch.
Figure 6:
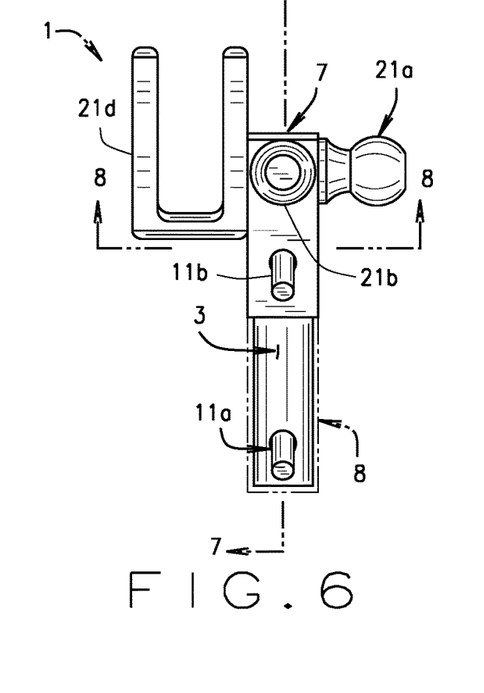
FIG. 6 is a another side elevational view of the hitch.
Figure 7:
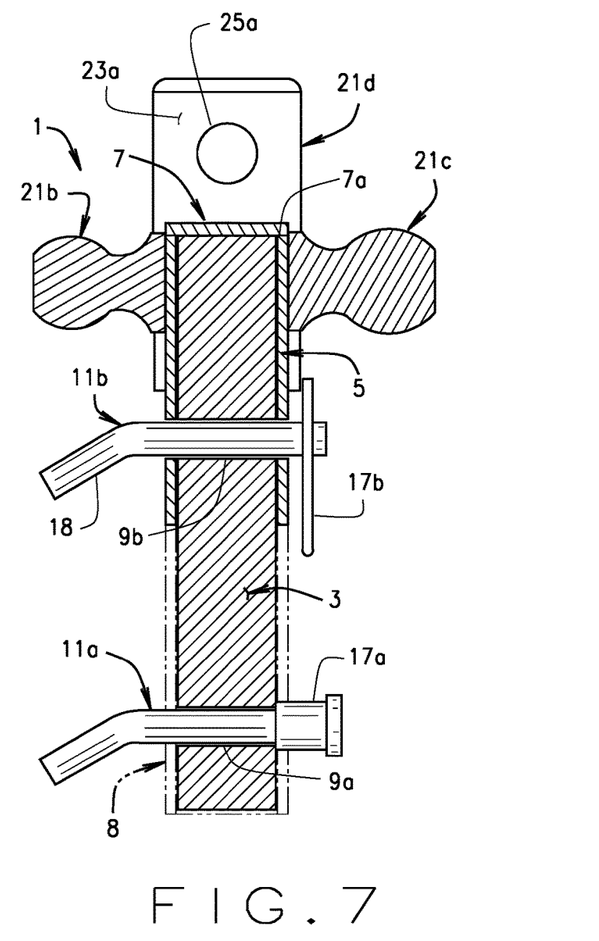
FIG. 7 is a cross-section view of the hitch taken along line 7-7 of FIG. 6 on a somewhat larger scale than FIG. 6.
Figure 8:
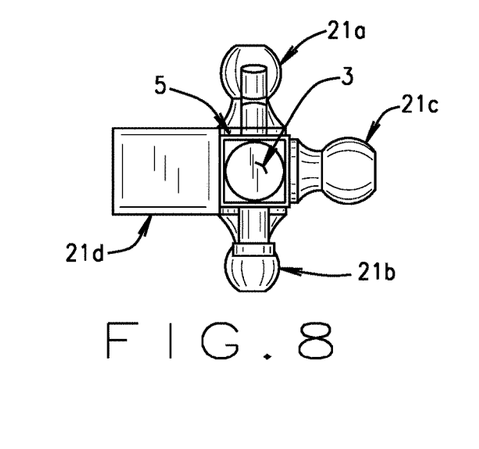
FIG. 8 is a cross-sectional view of the hitch taken along line 8-8 of FIG. 6 and rotated 180°.
Figure 9:
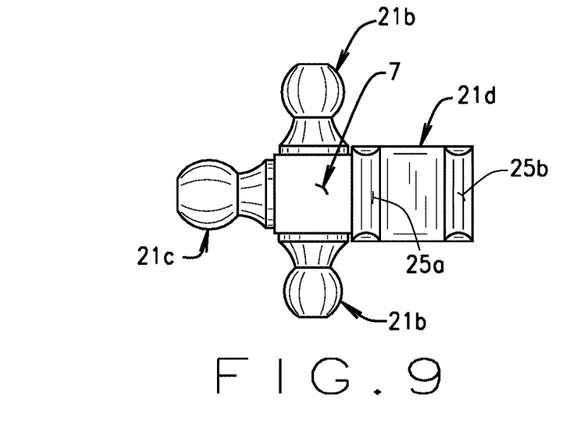
FIG. 9 is an end elevational view of FIG. 4.

Referring now to the drawings, and particularly to FIGS. 1 and 2, a multiple ball/clevis hitch of the present disclosure is indicated in its entirety at 1. Hitch 1 comprises a main hitch member, as indicated at 3, which, as shown in FIGS. 1-9, is preferably a circular cross-section solid or tubular shaft or rod. An outer hitch member 5 is shown to be a hollow tube, which as shown in the drawings is a square tube, but which may be a hollow tube of other cross-sectional shape (e.g., circular) so long as the opening through the tube is of sufficient cross sectional size to receive the main hitch member 3 and to permit rotation of the outer hitch member 5 on the main hitch member 3. A retaining plate 7 is secured, such as by welding, to the outer or distal end of the main hitch member 3 for purposes as will appear. Plate 7 is sized to be somewhat larger than the opening through outer hitch member 5 for purposes as will appear. Main hitch member 3 is adapted to be inserted through outer hitch member 5 so that the retaining plate 7 engages the outer end 7a (as shown in FIG. 2) of the outer hitch member 5 thus preventing removal of the outer hitch member from the inner main hitch member 3. Thus, the proximal end of the main hitch member 3 extends well beyond the proximal end of the outer hitch member 5 such that the proximal end of main hitch member 3 is received within a tubular hitch receiver 8 (as shown in FIG. 7). As is conventional, the hitch receiver 8 is connected to a tow vehicle such as a pickup truck or the like (not shown), for towing a trailer (not shown) attached to hitch 1. Those of ordinary skill in the art will recognize that the tow vehicle need not be a pickup truck but it could be any vehicle and that a trailer is not limited to a conventional trailer, but the term "trailer" would include anything thing that is towed, such as an air compressor, a farm implement, or any other towed equipment or towed vehicle.

As best shown in FIG. 2, the main hitch member 3 has a pair of locking pin holes 9a, 9b, with hole 9a being referred to as the proximal or first locking pin hole and with hole 9b being referred to as the distal or second locking pin hole. The proximal locking pin hole 9a is adapted (or configured) to receive a proximal or first locking pin 11a and the distal pin hole is adapted to receive a distal or second locking pin 11b. Outer hitch member 5 has a plurality of (e.g., four) locking pin holes 13a-13d therein, with holes 13a, 13c and holes 13b, 13d being in opposed faces of the square cross-section outer hitch member 5 and being in axial alignment with one another for receiving distal locking pin 11b, which pin is also received in distal hole 9b in the main hitch member 3. Receiver 8 has a pair of aligned holes 15a, 15b therethrough. With the outer hitch member 5 receiving the main hitch member 3 and with proximal end of main hitch member fully received in receiver 8, the proximal end of the outer hitch member 5 preferably abuts (or is in close proximity to) the outer end of receiver 8 and the holes 15a, 15b in receiver 8 are aligned with the proximal locking pin hole 9a in the main hitch member 3. Thus, with the proximal locking pin 11a inserted through holes 15a, 15b in the receiver and through hole 9a in the main hitch member, hitch 1 is secured to the receiver 8.

Each of the locking pins 11a, 11b is retained in its respective installed position by a respective retainer, as generally indicated at 17a, 17b. As indicated at 18, the distal end of each of the locking pins has a bend 18 such that the pin is bent with respect to its longitudinal axis. In accordance with the present disclosure, it is preferred that retainer 17a for the first or proximal pin 11a is a lock removably applied to its straight end of the pin 11a protruding through the proximal hole 9a in main hitch member 3 and through hole 13d in main member 5. As shown in FIG. 1, locking retainer 17a is larger than hole 13d such that the bent end 18 and the locking retainer 17a prevent the removal of pin 9a, unless retainer 17a is unlocked with a key. Such a lock may be a Master Lock model 2866DAT Trailer Hitch Lock commercially available at www.Walmart.com, but those skilled in the art will recognize that a wide variety of commercially available similar pin hitch locks may be substituted to the above-described Master Lock model. Pin 11a used in conjunction with the above described Master Lock trailer hitch lock has a locking groove 20 (as shown in FIG. 2) proximate its outer end and the lockable retainer 17a has housing that receives the outer end of the pin. The lockable housing has a locking lug (also not shown) that when locked, engages the groove 20 in the pin so as to prevent the lock from being removed from the pin such that the pin 11a is held captive in a locked position preventing the pin 11a from being removed from the hitch receiver and from the main hitch member. In this manner, the hitch 1 is locked to the receiver 8 (and thus to the tow vehicle) and cannot be removed except if the retainer 17a is unlocked with a key and pin 9a is removed from the hitch. As shown, in accord with the present disclosure, the retainer 17b for pin 9b need not be a lockable retainer, but rather can be a spring clip retainer that can be readily inserted through a hole 22 (as shown in FIGS. 1 and 2) in the end of pin 11b and may be readily removed from the pin without the use of any special hand tools or a key so as to permit rotation of the outer hitch member 5 on main hitch member 3. Main hitch member 3, shown in the drawings as hollow, could alternatively be solid, such as a solid bar, with locking pin holes 9a and 9b extending through the solid bar structure and receiving the pins 11a and 11b.

The outer hitch member or tube 5 preferably has multiple trailer hitch elements or members 21a-21d secured thereto, one on each side of the square tube forming tube 5. Specifically, the outer hitch tube is shown to have three trailer hitch balls 21a, 21b and 21c secured (preferably welded) to a respective outer or fourth face of the square hitch tube 5 and a clevis hitch 21d welded to the other outer face of the hitch tube. Balls 21a-21c are preferably of different common sizes having, for example, respective diameters of 1⅞", 2" and 2 5/16" so that the appropriate sized trailer hitch ball can be used to couple a trailer having a socket type hitch to hitch 1 using the correctly sized hitch ball. In accordance with the present disclosure, if a trailer having a 2" socket is desired to be hitched to hitch 1, the hitch pin non-locking retainer 17b is removed from the distal end of pin 11b and this hitch pin is removed from outer hitch tube 5. With this pin 17b removed; the outer hitch tube 5 may be rotated on main hitch member 3 until the desired trailer hitch ball 21b having a 2" diameter is in the top position. The hitch pin 11b may then be inserted through appropriate holes 13 in the outer hitch member 5 and through the hole 9b in the main hitch member 3 and retainer 17b is reinstalled to prevent the pin 9b from becoming disengaged from hitch 1 while a trailer is being pulled by the tow vehicle. However, because end plate 7 is secured (preferably welded) to the outer end of the main hitch member 3 and because the end plate is somewhat larger than opening of the outer hitch member 5, if the outer tube 5 is moved distally, the end 7a of the outer hitch member will engage retainer plate 7 such that the outer hitch member cannot be removed from the main hitch shaft 3. Of course, unless the locking retainer 17a is removed from pin 11a and pin 11a is removed from the receiver, the main hitch member 3 remains coupled to the receiver.

A clevis hitch 21d is also shown to be secured (e.g., welded) to a face of outer hitch member 5. Clevis hitch 21d is shown to have a pair of spaced clevis members 23a, 23b with a pair of axially aligned hitch pin receiving holes 25a, 25b therein. As is well known to those skilled in the art, if a trailer having a straight hitch bar or tang (not shown) is to be hitched to hitch 1, the clevis hitch 21d may be rotated into position to receive the straight bar hitch in the manner above described and a pin (not shown) may be inserted through holes 25a, 25b and through a corresponding hole (also not shown) in the straight hitch member of the trailer to hitch the trailer to the tow vehicle.

Figure 10:
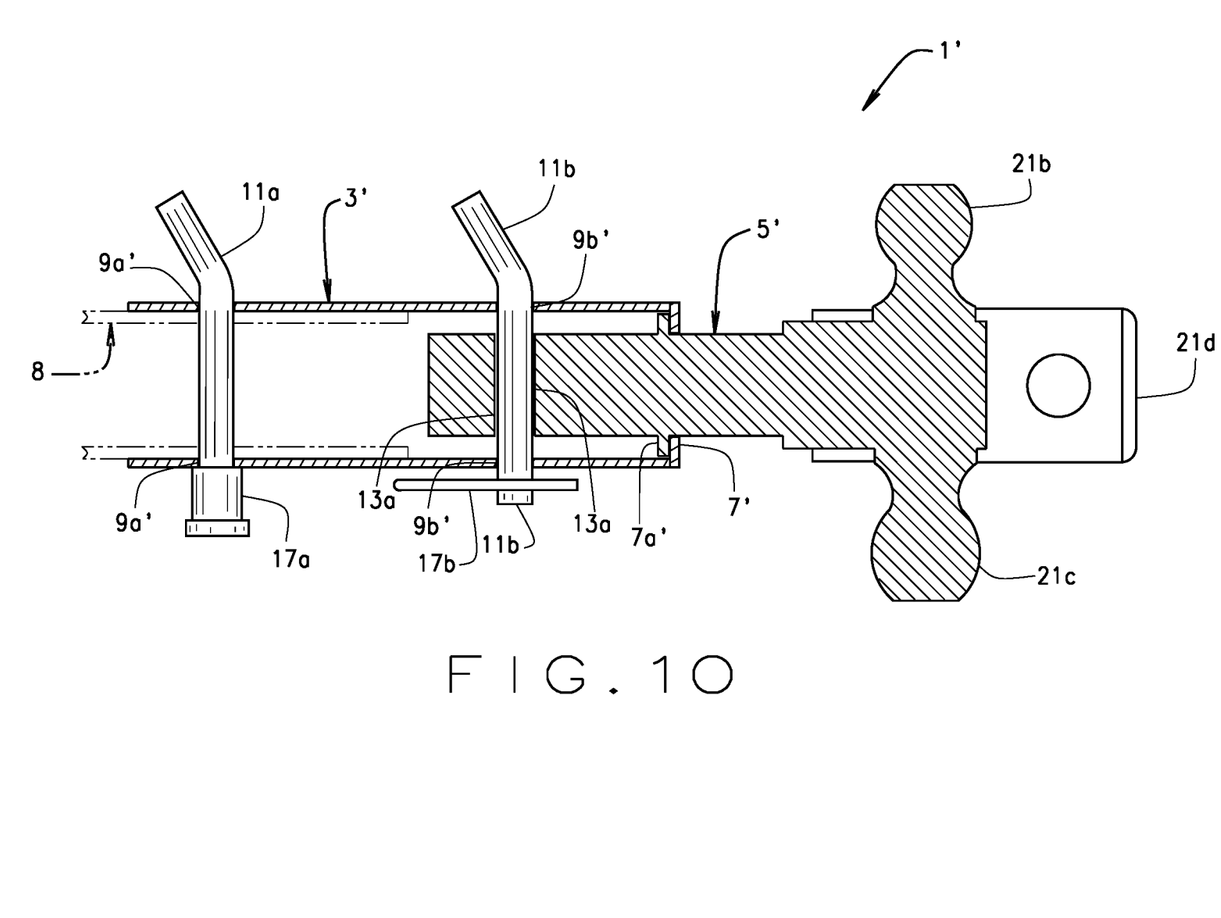
FIG. 10 is a cross sectional view similar to FIG. 7 of another embodiment of the present disclosure of a multiple hitch member hitch assembly in which the main hitch member is telescopically received on the outside of the hitch receiver and in which the hitch member is telescopically received within the main hitch member.

Further in accord with the present disclosure, another preferred embodiment of a multiple hitch member assembly 1' for connecting a trailer to a tow vehicle is shown in FIG. 10. The first embodiment of the multiple hitch assembly 1 is shown in FIGS. 1-9, and the other embodiment 1' is shown in FIG. 10, where the similar components of embodiment 1' have the same reference numbers as the first embodiment but are "primed" reference characters. More specifically, embodiment 1' comprises a main hitch member 3' and a hitch member 5' rotatable with respect to the main hitch member 3', where the main hitch member 3' is received on the outside of hitch receiver 8. The hitch member 5' rotatably received within main hitch member 3' and has a plurality of hitch elements (e.g., 21a-21d) secured to its outer or distal end at different angular positions. The main hitch member 3' has a retainer 7' at its distal end that extends somewhat inwardly of the opening of the main hitch member, as shown in FIG. 10. The retainer 7' is configured to engage a retainer surface 7a' on the hitch member 5' so as to prevent outward movement of the hitch member 5' relative to the main hitch member 3'. Retainer surface 7a' is shown to be a circumferential, outwardly projecting from hitch member 5'.

The main hitch member 3' further has a first retainer pin receiving hole 9a' therethrough proximate its proximal end configured to receive a first pin 11a for coupling the main hitch member 3' to the hitch receiver 8, and a second retainer pin receiving hole 9b' more proximate the distal end of the main hitch member 3' configured to receive a second pin 11b for coupling the hitch member 5' to the main hitch member 3' so as to prevent rotation and endwise movement of the main hitch member 3' and the hitch member 5' relative to one another. The main hitch member 3' is further configured so that with the first pin 11a in place for securing the main hitch member 3' to the hitch receiver 8 (as shown in phantom lines) and so that with the second pin 11b' removed, the hitch member 5' is rotatable relative to the main hitch member 3' so as to rotatably position a selected one of the hitch elements 21a-21d in a desired position so that a trailer may be hitched to the tow vehicle using the one selected hitch element. The hitch member 5' has a pair of holes 13a', 13b' therethrough at right angles relative to one another for receiving the second pin 11b' such that with the second pin 11b removed the hitch member 5' may be rotated with respect to the main hitch member 3' so that a desired hitch element 21a-21d may be rotatably positioned in the desired position and so that when pin 11b is re-inserted the desired hitch element is held in position for hitching a trailer to the tow vehicle. With pin 11b removed, retainer surface 7a' engages retainer 7' preventing endwise removal of the hitch member 5' from the main hitch member 3'. Further, with the pin 11b re-installed in a respective holes 13a', 13b' in the hitch member 5' and re-installed in a respective hole 9b' of hitch member 5' the hitch member 5' is coupled to the main hitch member 3' and is fixed against rotation with respect to the main hitch member 3'.

As various changes could be made in the above constructions without departing from the broad scope of the disclosure, it is intended that all matter contained in the above description or shown in the accompanying drawings shall be interpreted as illustrative and not in a limiting sense.

What is claimed is:

1. A multiple hitch member assembly for connecting a trailer to a tow vehicle where the tow vehicle has a hitch receiver secured to the tow vehicle, said multiple hitch assembly comprising:
   a. a main hitch shaft;
   b. an outer hitch tube receiving said hitch shaft wherein said shaft has an end retaining plate secured to its distal end;
   c. said main hitch shaft having a length and shape configured to extend through said outer hitch tube and configured to be received in said hitch receiver, said outer hitch tube having a plurality of hitch members secured thereto at different angular positions thereon; and
   d. said hitch shaft further having a first retainer pin receiving hole therethrough proximate its proximal end configured for receiving a first pin for coupling said hitch shaft to said hitch receiver, and a second retainer pin receiving hole more proximate its outer end for receiving a second pin for coupling said hitch member shaft to said outer hitch tube, configured with said first pin in place for securing said hitch member shaft to said hitch receiver, and with said second pin removed configured for said outer hitch tube to be rotated on said hitch shaft to allow a desired hitch member to be rotatably positioned in a desired position, and configured for said end retaining plate to prevent the removal of said hitch shaft and the hitch from said hitch receiver.

2. A multiple hitch as set forth in claim 1 further comprising a retainer for retaining said first pin in its installed position so as to secure said hitch to said receiver.

3. A multiple hitch as set forth in claim 2 wherein said retainer for said first pin is a lockable retainer.

4. A multiple hitch as set forth in claim 2 further comprising a retainer configured for retaining said second pin in its installed position such that said second pin prevents rotation of said outer hitch tube on said hitch shaft.

5. A multiple hitch as set forth in claim 4 wherein said retainer for said second pin is a spring clip retainer configured to be readily removed without the use of a key.

6. A multiple hitch as set forth in claim 1 wherein said end retainer plate has a configuration to be sufficiently large relative to the outer hitch tube such that it can engage the outer hitch tube to prevent said outer hitch tube from being removed from said hitch shaft when said second pin is removed.

7. A multiple hitch as set forth in claim 1 wherein said outer hitch tube is a generally square cross-section tube having a generally square opening therethrough with this last-said opening being sized to receive said hitch shaft and to permit rotation of said hitch tube on said hitch shaft.

8. A multiple hitch as set forth in claim 7 wherein a hitch ball of a different size is secured to each of three of the outer faces of the square cross-section outer hitch tube.

9. A multiple hitch as set forth in claim 8 wherein one of said hitch balls has a spherical diameter of about 1⅞", a second of said balls has a spherical diameter of about 2", and the third of said balls has a spherical diameter of about 2 5/16".

10. A multiple hitch as set forth in claim 8 wherein a clevis hitch is secured to the fourth outer face of the square cross-section outer hitch tube.

11. A multiple hitch member assembly (1 or 1') for connecting a trailer to a tow vehicle where the tow vehicle has a hitch receiver (8) secured to the tow vehicle, said multiple hitch member assembly (1 or 1') comprising:
   a. a main hitch member (3 or 3') adapted to be secured to said hitch receiver (8);
   b. a hitch member (5 or 5') rotatable with respect to said main hitch member (3 or 3') and having a plurality of hitch elements (e.g., 21a-21d) secured thereto at different angular positions;
   c. said main hitch member (3 or 3') having a retainer (7 or 7') proximate its distal end with said retainer (7 or 7') configured to engage a retainer surface (7a or 7a') on said hitch member (5 or 5') so as to prevent outward movement of said hitch member (5 or 5') relative to said main hitch member (3 or 3');
   d. said main hitch member (3 or 3') further having a first retainer pin receiving hole (9a) therethrough proximate its proximal end configured to receive a first pin (11a) for coupling said main hitch member (3 or 3') to said hitch receiver (8), and a second retainer pin receiving hole (9b) more proximate the distal end of said main hitch member (3 or 3') configured to receive a second pin (11b) for coupling said hitch member (5 or 5') to said main hitch member (3 or 3') so as to prevent rotation and endwise movement of said main hitch member (3 or 3') and said hitch member (5 or 5') relative to one another;
   e. said main hitch member (3 or 3') being further configured so that with said first pin (11a) in place for securing said main hitch member (3 or 3') to said hitch receiver (8) and so that with said second pin (11b) removed, said hitch member (5 or 5') is rotatable relative to said main hitch member (3 or 3') so as to rotatably position a selected one of said hitch elements (21a-21d) in a desired position so that a trailer may be hitched to said tow vehicle using said one selected hitch element; and
   f. said hitch member (5 or 5') having a plurality of holes (13a-13d or 13a', 13b') therethrough for receiving said second pin (11b) such that with said second pin (11b) removed said hitch member (5 or 5') may be rotated with respect to said main hitch member (3 or 3') so that a desired hitch element (21a-21d) may be rotatably positioned in said desired position and so that said retainer (7 or 7') prevents endwise removal of said hitch member (5 or 5') from said main hitch member (3 or 3') and so that with said second pin (11b) re-installed in a respective hole (13a-13d or 13a', 13b') in said hitch member (5 or 5') and re-installed in a respective hole (9b or 9b') of hitch member (5 or 5') said hitch member (5 or 5') is coupled to said main hitch member (3 or 3') and is fixed against rotation with respect to said main hitch member (3 or 3').

* * * * *